（12) United States Patent
Liu (10) Patent No.: US 10,365,761 B2
(45) Date of Patent: Jul. 30, 2019

(54) CAPACITIVE POSITION SENSING WITH PRESSURE COMPENSATION USING DUAL-ELECTRODE SENSOR

(71) Applicant: Texas Instruments Incorporated, Dallas, TX (US)

(72) Inventor: Dongtai Liu, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/673,870

(22) Filed: Mar. 30, 2015

(65) Prior Publication Data

US 2015/0277662 A1    Oct. 1, 2015

Related U.S. Application Data

(60) Provisional application No. 61/972,798, filed on Mar. 31, 2014.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC ............................ G06F 3/0418; G06F 3/044
See application file for complete search history.

(56) References Cited

U.S. PATENT DOCUMENTS

2003/0028346 A1* 2/2003 Sinclair ............... G06F 3/03547
702/150
2009/0101416 A1 4/2009 Chuang
(Continued)

FOREIGN PATENT DOCUMENTS

CN  101849218 A  9/2010
CN  102414647 A  4/2012
(Continued)

OTHER PUBLICATIONS

PCT Search Report dated Mar. 31, 2015.
EU Search Report for Application No. 15773311.4-1507/3126939, dated Oct. 18, 2017.
PRC Search Report for Application No. 201580018025.7, dated: Sep. 21, 2018.

*Primary Examiner* — Nitin Patel
*Assistant Examiner* — Amy Onyekaba
(74) *Attorney, Agent, or Firm* — Andrew Viger; Charles A. Brill; Frank D. Cimino (57) ABSTRACT

A capacitive sensing methodology is suitable for sensing touch position along a sensor track based on touch capacitance based on touch position and touch pressure. The method is operable with a capacitive sensor including first and second capacitive sensor electrodes juxtaposed in a complementary configuration to define the sensor track, the complementary first and second sensor electrodes configured such that, as touch position moves along the sensor track, the electrode capacitance $C_{SA}$ of one sensor electrode monotonically decreases, and the electrode capacitance $C_{SB}$ of the complementary other sensor electrode monotonically increases, so that the touch capacitance corresponds to a combination of $C_{SA}$ and $C_{SB}$. Pressure-compensated touch position data is generated from touch position information generated based on position and pressure functions, where the position function generates position information based on $C_{SA}$ and $C_{SB}$, and the pressure function generates pressure information based on $C_{SA}$ and $C_{SB}$.

14 Claims, 6 Drawing Sheets

(56) References Cited

U.S. PATENT DOCUMENTS

| | | |
|---|---|---|
| 2010/0156839 A1 | 6/2010 | Ellis |
| 2010/0277433 A1 | 11/2010 | Lee et al. |
| 2011/0062971 A1* | 3/2011 | Badaye .................. G06F 3/044 324/686 |
| 2011/0267302 A1 | 11/2011 | Fasshauer |
| 2012/0032907 A1 | 2/2012 | Koizumi et al. |
| 2012/0062506 A1* | 3/2012 | Chae ....................... G06F 3/044 345/174 |
| 2012/0162123 A1* | 6/2012 | Kent ....................... G06F 3/044 345/174 |
| 2012/0306802 A1* | 12/2012 | McCracken .......... G06F 3/0416 345/174 |
| 2013/0050130 A1 | 2/2013 | Brown |
| 2013/0162588 A1* | 6/2013 | Wen ...................... G06F 3/0416 345/174 |
| 2013/0187704 A1 | 7/2013 | Edwards |
| 2014/0049501 A1* | 2/2014 | Santos .................... G06F 3/044 345/174 |
| 2015/0035790 A1* | 2/2015 | Mo ........................ G06F 3/044 345/174 |

FOREIGN PATENT DOCUMENTS

| | | |
|---|---|---|
| JP | 2013045398 A | 3/2013 |
| JP | 2014044561 A | 3/2014 |
| WO | 2009061044 A1 | 5/2009 |

\* cited by examiner

CAPACITIVE POSITION SENSING WITH PRESSURE COMPENSATION USING DUAL-ELECTRODE SENSOR

CROSS-REFERENCE TO RELATED APPLICATIONS

Priority is claimed under USC§ 119(e) to U.S. Provisional Application 61/972,798, filed Mar. 31, 2014).

BACKGROUND

Technical Field

This Patent Document relates generally to capacitive touch sensing, such as for touch/position sensing.

Related Art

Capacitive sensing is a common technology for human interface devices (HID). Example applications are touch and position sensing.

For position sensing, touch position is sensed along a defined sensor track, such as position along a linear track, or radial position around a circular track. The HID capacitive position sensor includes a capacitive sensor configured to define the sensor track, such as a linear slider or circular dial.

One capacitive sensing technique uses projected self-capacitance in which a capacitive sensor (electrode) is disposed on a substrate (such as a PCB) with a ground pattern. The sensor electrode is configured to define the sensor track, with an overlay (coating) that includes position marking/patterning corresponding to the defined sensor track. The sensor electrode is coupled to sensor electronics through an excitation/acquisition channel.

When driven with an excitation signal, the sensor electrode forms a parasitic capacitance with the sensor ground, projecting a sensing E-field through the overlay, and forming a sensing area on the surface of the overlay corresponding to the sensor track defined by the sensor electrode. The capacitive sensor can be configured with an underlying shield that is driven by the sensor electronics to generate a shield E-field with the same polarity and phase as the sensor E-field, concentrating (focusing) the sensor E-field in the sensing direction, and increasing sensitivity.

When a finger (body conductor) touches the sensing area along the sensor track, the projected E-field in the touch/contact area is altered, effectively adding a touch capacitance to the projected capacitance (parasitic capacitance of the sensor electrode) associated with touch position. Total sensor capacitance measured by the sensor electronics at the touch position corresponds to the sum of the projected/parasitic capacitance and the touch capacitance.

BRIEF SUMMARY

This Brief Summary is provided as a general introduction to the Disclosure provided by the Detailed Description and Drawings, summarizing some aspects and features of the Disclosure. It is not a complete overview of the Disclosure, and should not be interpreted as identifying key elements or features of the invention, or otherwise characterizing or delimiting the scope of the invention disclosed in this Patent Document.

The Disclosure describes apparatus and methods for a capacitive sensing system suitable for sensing touch position along a defined sensor track based on touch capacitance, where touch capacitance is based on touch position and touch pressure.

According to aspects of the Disclosure, a methodology for capacitive sensing is suitable for sensing touch position along a defined sensor track based on touch capacitance, where touch capacitance is based on touch position and touch pressure, the method operable with a capacitive sensor including first and second capacitive sensor electrodes juxtaposed in a complementary configuration to define the sensor track with a first position at one end and a second position at another end, the complementary first and second sensor electrodes configured such that a touch contact area at a touch position of the sensor track extends over both sensor electrodes, and such that, as touch position (touch contact area) moves from the first position to the second position along the sensor track, a first electrode capacitance $C_{SA}$ of the first sensor electrode monotonically decreases, and a second electrode capacitance $C_{SB}$ of the second sensor electrode monotonically increases, and the touch capacitance corresponds to a combination of $C_{SA}$ and $C_{SB}$.

According to aspects of the disclosure, the methodology involves: (a) acquiring, from the first and second the complementary electrodes, respective capacitance readings $C_{SA}$ and $C_{SB}$; (b) generating touch position information based on position and pressure functions, where the position function generates position information based on $C_{SA}$ and $C_{SB}$, and the pressure function generates pressure information based on $C_{SA}$ and $C_{SB}$; and (c) generating pressure-compensated touch position data corresponding to the touch position based on the touch position information, including compensation for changes in touch capacitance due to touch pressure.

Other aspects and features of the invention claimed in this Patent Document will be apparent to those skilled in the art from the following Disclosure.

BRIEF DESCRIPTION OF THE DRAWINGS

FIGS. 4A/4B are example plots illustrating sensor capacitance $C_{SA}$ and $C_{SB}$ in relation to position and pressure.

FIGS. 5A/5B are example plots representative of an example methodology for generating pressure-compensated touch position data from touch position information using dual-complementary capacitance measurements $C_{SA}$ and $C_{SB}$.

DETAILED DESCRIPTION

This Description and the Drawings constitute a Disclosure of example embodiments and applications that illustrate various features and advantages of apparatus/methodology for capacitive position sensing with pressure compensation using a dual-electrode capacitive sensor.

One of the problems addressed by capacitive position sensing with pressure compensation is the accurate detection of position based on capacitive touch, where touch capacitance changes due to touch pressure.

In brief overview, the Disclosure of apparatus/methodology for capacitive position sensing with pressure compensation using a dual-electrode capacitive is suitable for sensing touch position along a defined sensor track based on touch capacitance, where touch capacitance is based on touch position and touch pressure. In example embodiments, a capacitive sensing system based on the Disclosure includes a capacitive sensor including first and second capacitive sensor electrodes juxtaposed in a complementary configuration to define the sensor track with a first position at one end and a second position at another end. The complementary first and second sensor electrodes are configured such that a touch contact area at a touch position of the sensor track extends over both sensor electrodes—as touch position (touch contact area) moves from the first position to the second position along the sensor track: (a) a first electrode capacitance $C_{SA}$ of the first sensor electrode monotonically decreases, and (b) a second electrode capacitance $C_{SB}$ of the second sensor electrode monotonically increases, such that (c) the touch capacitance corresponds to a combination of $C_{SA}$ and $C_{SB}$.

A sensor unit is coupled to the first and second sensor electrodes, and configured to generate pressure-compensated touch position data corresponding to the touch position, including: (a) acquisition circuitry configured to acquire capacitance readings $C_{SA}$ and $C_{SB}$ from respectively the first and second sensor electrodes, and (b) conversion circuitry configured to generate touch position information based on position and pressure functions, in which the position function generates position information based on $C_{SA}$ and $C_{SB}$, and the pressure function generates pressure information based on $C_{SA}$ and $C_{SB}$. The sensor unit configured to generate the pressure-compensated touch position data based on the touch position information, including compensation for changes in touch capacitance due to touch pressure.

In example embodiments, the position function generates position information as a function of ($C_{SA}/C_{SB}$), and the pressure function generates pressure information as a function of ($C_{SA}*C_{SB}$), such as an exponential function of ($C_{SA}*C_{SB}$). In other example embodiments, the touch position information is generated based on: $(C_{SA}/C_{SB})^\wedge(C_{SA}*C_{SB})^{-P}$.

In example embodiments, the sensor unit can be implemented with a capacitance-to-digital converter (CDC), and a position processor. The CDC can be configured to drive the first and second sensor electrodes, and to acquire the capacitance readings $C_{SA}$ and $C_{SB}$, and to convert them to corresponding touch position information. The position processor can be configured to generate the pressure-compensated touch position data from the touch position information based on the position and pressure functions.

Figure 1A:
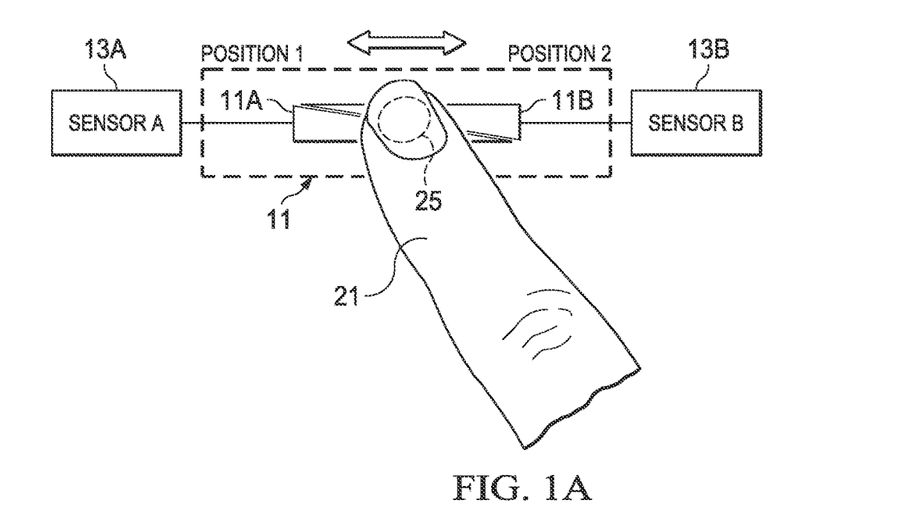
FIG. 1A illustrates an example functional embodiment of a capacitive position sensing system 10, such as can be adapted as a HID (human interface device) for sensing touch position. Capacitive position sensing system 10 includes a capacitive sensor 11 with dual sensor electrodes 11A/11B, and associated sensor electronics 13A/13B.

FIG. 1A illustrates an example functional embodiment of a capacitive position sensing system 10, such as can be adapted as a HID (human interface device) for sensing touch position. Capacitive position sensing system 10 includes a capacitive sensor 11 with dual sensor electrodes 11A/11B, and associated sensor electronics 13A/13B.

Dual-electrode capacitive sensor 11 is characterized by an HID position sensing configuration in which the dual sensor electrodes 11A/11B are configured for a particular sensor track layout, arranged for position sensing along a defined sensor track. The example HID capacitive sensor configuration illustrated in FIG. 1A is a linear sensor track layout, between position 1 and position 2, such as for an HID linear slider with lateral position sensing.

Dual-electrode capacitive sensor 11 (11A/11B) and associated sensor electronics 13A/13B are cooperatively configured according to a selected capacitive sensing technique. The example capacitive sensing configuration illustrated in FIG. 1A is based on projected self-capacitance, such as by capacitive charge transfer from the dual sensor capacitor electrodes 11A/11B. An alternative capacitive sensing configuration is based on resonance state of respective sensor LC resonators that incorporate respective sensor electrodes 11A/11B (tank capacitor).

The sensor electronics, functionally illustrated separately as 13A/13B, can be implemented as a single capacitance-to-digital/data conversion (CDC) unit coupled to respective sensor capacitor electrodes 11A/11B through respective excitation/acquisition channels. The CDC can be implemented for capacitive sensing (each channel) based on multi-phase capacitive charge transfer, such as with a switched capacitor amplifier that includes a charge transfer (feedback) capacitor. For example, the CDC can selectively switch between an excitation/charge phase in which a respective sensor electrode is switch-coupled to an excitation source to project the sensor E-field, and a transfer/discharge phase in which the sensor electrode is switch-coupled to a charge transfer capacitor, with sensor capacitance $C_{SA}/C_{SB}$ measured in successive charge transfer cycles.

For the example HID position sensing configuration illustrated in FIG. 1A, the dual capacitive electrodes 11A/11B are configured with complementary triangular profiles, juxtaposed in a rectangular arrangement that defines the HID linear sensor track layout. Other conventional elements associated with a capacitive sensing configuration based on projected self-capacitance, such as an overlay, are not shown in the functional illustration of FIG. 1A (see, FIG. 3A).

The touch position of a finger 21 along the HID sensor track corresponds to a touch/contact area 25 in which finger 21 contacts the capacitive electrodes 11A/11B. Sensor 11 is configured so that touch/contact area 25 extends across both capacitive electrodes 11A/11B. The functional illustration in FIG. 1A is not drawn to scale. For example, for a finger contact area 25 of around 10 mm, a typical width for a linear sensor 11 with a rectangular configuration (linear sensor track) would be 1 mm, thus ensuring that finger contact area 25 covers contiguous portions of both sensor electrodes 11A/11B.

Touch position along the HID sensor track is based on touch capacitance, where touch capacitance is based on touch position and touch pressure.

Figure 1B:
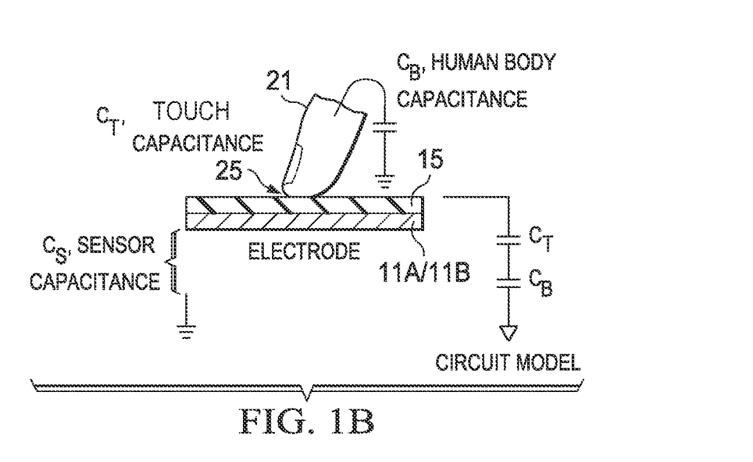
FIG. 1B illustrates sensor capacitance in relation to touch capacitance. Sensor 11 is represented by sensor electrode 11A/11B with an overlay 15. Finger 21 contacts sensor overlay 15 at the contact area 25.

FIG. 1B illustrates sensor capacitance in relation to touch capacitance. Sensor 11 is represented by sensor electrode 11A/11B with an overlay 15. Finger 21 contacts sensor overlay 15 at the contact area 25.

Sensor capacitance $C_S$ is a measure of both touch capacitance $C_T$ at touch/contact area 25, and body capacitance $C_B$. Body capacitance can also be coupled to the sensor ground, such as by holding a system/device (such as a mobile handset).

Touch capacitance $C_T$ and body capacitance $C_B$ are effectively in series, so that sensor capacitance $C_S$ is given by $$C_S = C_T * C_B / (C_T + C_B) \approx C_T$$

where $(C_B \gg C_T)$. For example, body capacitance $C_B$ can be on the order of nF, while touch capacitance will be on the order of pF.

Touch capacitance $C_T$ is affected by touch pressure. Pressure-related capacitance is a function of both contact area 25, and skin layer compression. Pressure obviously increases contact area increasing touch capacitance. Less obviously, pressure also increases capacitance by compressing the less conductive skin epidermis, so that the more conductive skin dermis is closer to the surface of sensor 11 (thereby receiving more of the projected sensor E-field).

Referring to FIG. 1A, capacitive sensing system 10 is configured to sense touch position along the HID sensor track (between position 1 and 2). The example HID sensor track layout configuration uses triangular-profiled sensor electrodes 11A/11B, juxtaposed in a complementary rectangular arrangement to define the linear HID sensor track.

Sensor electrodes 11A/11B are configured such that: (a) a touch contact area at a touch position of the sensor track extends over both sensor electrodes; and (b) as touch position (touch contact area) moves along the sensor track from position 1 to position 2, an electrode capacitance $C_{SA}$ associated with sensor electrode 11A monotonically decreases, and an electrode capacitance $C_{SB}$ associated with sensor electrode 11B monotonically increases. Touch capacitance corresponds to a combination of $C_{SA}$ and $C_{SB}$.

FIG. 1A illustrates an example HID layout configuration in which sensor electrodes 11A/11B are configured with complementary triangular profiles, juxtaposed in a rectangular arrangement to define a linear HID sensor track (such as for slider/lateral position sensing). This example HID layout configuration is not a design/configuration requirement or constraint for capacitive position sensing using a dual-electrode capacitive sensor according to the Disclosure. The design requirements for the sensor are: (a) dual sensor electrodes arranged in a juxtaposed complementary configuration that defines an HID sensor track layout; (b) the sensor electrodes are configured/arranged so that (1) a touch/contact area extends across both sensor electrodes, and (2) as touch position (contact area) moves along the sensor track, the electrode capacitance ($C_{SA}$) associated with one sensor electrode monotonically decreases, and the electrode capacitance ($C_{SB}$) associated with the other complementarily-configured sensor electrode monotonically increases, such that touch capacitance corresponds to a combination of $C_{SA}$ and $C_{SB}$.

Figures 2A, 2B:
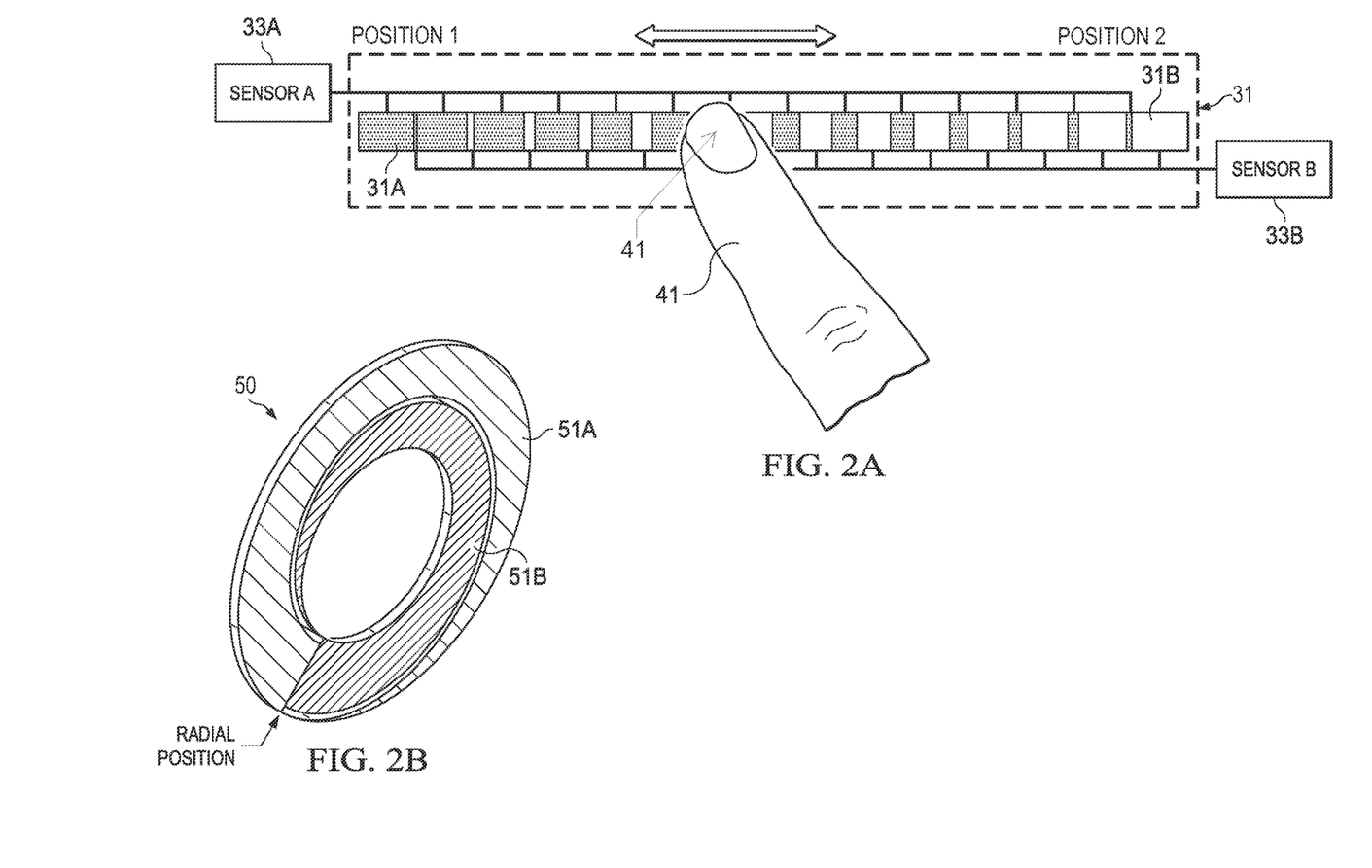
FIGS. 2A and 2B illustrate example alternate HID sensor track configurations using a capacitive sensor with dual complementary sensor electrodes according to the Disclosure.

FIGS. 2A and 2B illustrate example alternate HID sensor track configurations using a capacitive sensor with dual complementary sensor electrodes according to the Disclosure.

FIG. 2A illustrates an example HID sensor track configuration in which a sensor 31 is configured with capacitive electrodes 31A and 31B configured as complementary interleaved segments defining a linear sensor track layout. For each electrode, the electrode segments are coupled to respective sensor electronics 33A and 33B. A finger 41 in a touch position with a touch/contact area 45 extends across contiguous sensor electrode segments. As touch position (contact area) moves along the HID sensor track (position 1 to position 2), the electrode capacitance $C_{SA}$ associated with the sensor electrode segments 31A monotonically decreases, and the electrode capacitance $C_{SB}$ associated with complementarily-configured sensor electrode segments 31B monotonically increases.

FIG. 2B illustrates an example HID sensor track layout configuration in which a sensor 51 is configured with profiled capacitive electrodes 51A and 51B arranged in a juxtaposed complementary configuration defining a dial (circular) sensor track layout. As touch position (contact area) moves clockwise around the sensor track dial, the electrode capacitance $C_{SA}$ associated with the profiled sensor electrode 51A monotonically decreases, and the electrode capacitance $C_{SB}$ associated with complementarily-profiled sensor electrode 51B monotonically increases.

Figure 3A:
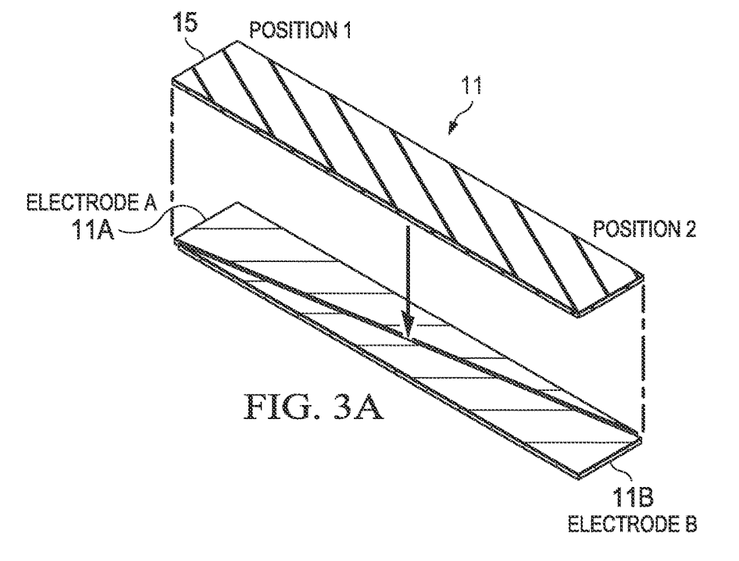
FIGS. 3A and 3B functionally illustrate example sensor configurations for the example capacitive sensor of FIG. 1A, with dual capacitive electrodes with complementary triangular profiles.
Figure 3B:
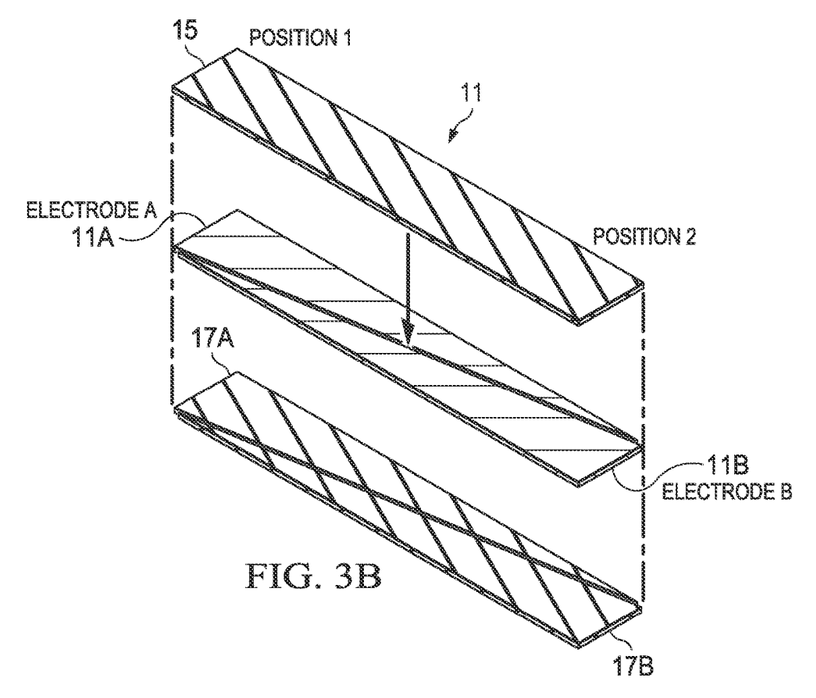

FIGS. 3A and 3B functionally illustrate example sensor configurations for the example capacitive sensor of FIG. 1A, with dual capacitive electrodes with complementary triangular profiles. The same sensor configurations can be adapted to other HID sensor track configurations (such as illustrated in FIGS. 2A/2B).

FIG. 3A illustrates the capacitive sensor 11 with dual triangular-profiled electrodes 11A/11B, and including an overlay 15. FIG. 3B illustrates the sensor 11 with dual triangular-profiled electrodes 11A/11B with overlay 15, and including respective driven shields 17A/17B, each configured with substantially the same triangular profile as the associated sensor electrodes 11A/11B. Capacitive sensors based on projected self-capacitance can use a driven shield configuration to increase sensitivity by canceling parasitic capacitance and concentrate the projected sensor E-filed in a preferred sensing direction, for example by driving shields 17A/17B with the same polarity and phase as the sensor projected E-field. The sensor electronics (implemented, for example as a CDC unit) can be configured to provide shield drive.

Referring to FIGS. 1A/1B, touch position along the HID sensor track is based on touch capacitance, where touch capacitance is based on touch position and touch pressure. Capacitive sensing system 10, including a sensor 11 with dual complementary sensor electrodes 11A/11B implements capacitive position sensing with pressure compensation, correcting touch position based on touch pressure.

Sensor electronics 13A/13B is configured to acquire dual complementary sensor capacitance measurements $C_{SA}$ and $C_{SB}$. The complementary capacitance measurements $C_{SA}$ and $C_{SB}$ can be converted into touch position information based on position and pressure information generated based on the complementary capacitance measurements $C_{SA}$ and $C_{SB}$. From the touch position information, sensor electronics 13A/13B generates pressure-compensated touch position data, including correcting touch position capacitance for changes in touch pressure capacitance.

As described above, sensor electronics 13A/13B can be implemented as a capacitance-to-digital/data conversion (CDC) unit. For example, the CDC unit can be implemented as a CDC circuit interfaced to a position processor (such as an MCU). The CDC circuit can be interfaced to the dual (complementary) electrode sensor 11 (11A/11B) through dual excitation/acquisition channels, and configured to drive the dual complementary sensor electrodes 11A/11B, and to acquire complementary capacitance readings $C_{SA}$ and $C_{SB}$, which can be converted to corresponding touch position information/samples), based on position and pressure functions (described below). The position processor can be configured to receive the touch position information/samples, and generate pressure-compensated touch position data. If the sensor is configured for driven shields, the CDC can provide shield drive synchronized to the electrode excitation drive.

Figure 4A:
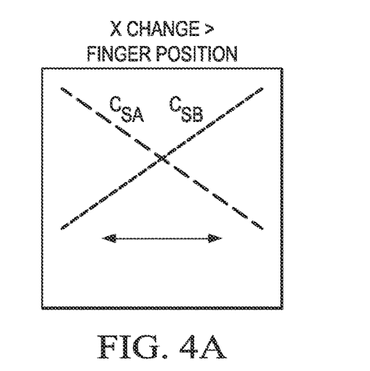
(FIG. 4A) is an example plot illustrating complementary changes in sensor capacitance $C_{SA}$ and $C_{SB}$ as a function of touch position along the HID sensor track (x-change)
Figure 4B:
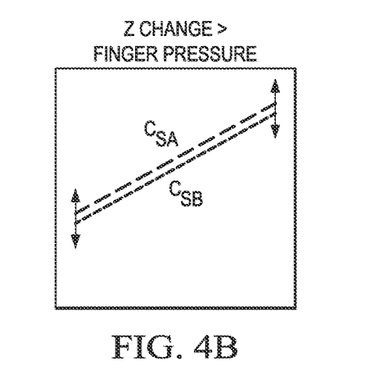
(FIG. 4B) is an example plot illustrating changes in sensor capacitance $C_{SA}$ and $C_{SB}$ as a function of touch pressure (represented as a z-change orthogonal to the HID sensor track). Note that pressure-related changes affect sensor capacitance $C_{SA}$ and $C_{SB}$ in parallel (non-complementary).

FIGS. 4A/4B are example plots illustrating sensor capacitance $C_{SA}$ and $C_{SB}$ in relation to position and pressure. FIG. 4A is an example plot illustrating complementary changes in sensor capacitance $C_{SA}$ and $C_{SB}$ as a function of touch position along the HID sensor track (x-change). FIG. 4B is an example plot illustrating changes in sensor capacitance $C_{SA}$ and $C_{SB}$ as a function of touch pressure (represented as a z-change orthogonal to the HID sensor track). Note that pressure-related changes affect sensor capacitance $C_{SA}$ and $C_{SB}$ in parallel (non-complementary).

In particular, FIG. 4A illustrates capacitive position sensing using dual complementary sensor electrodes. As touch position moves along the HID sensor track (x-direction): (a) sensor capacitance $C_{SA}$ of one sensor electrode monotonically decreases, and (b) sensor capacitance $C_{SB}$ of the other sensor electrode second sensor electrode monotonically increases. Touch capacitance corresponds to a combination of the $C_{SA}$ and $C_{SB}$ touch capacitance measurements.

Referring also to FIGS. 1A/1B, the example capacitive sensing system 10 implements capacitive touch position sensing with pressure compensation based on generating pressure-compensated touch position data as functions of the dual-complementary capacitance measurements $C_{SA}$ and $C_{SB}$ acquired from the dual-electrode capacitive sensor 11. Sensor electronics 13A/13B includes conversion circuitry configured to generate touch position information based on position and pressure functions: (a) the position function generates position information based on $C_{SA}$ and $C_{SB}$; and (b) the pressure function generates pressure information based on $C_{SA}$ and $C_{SB}$. Sensor electronics 13A/13B can be configured to generate the pressure-compensated touch position data based on the touch position information, including compensation for changes in touch capacitance due to touch pressure. For the example embodiment, FIGS. 5A/5B AND 6A/6B/6C are example plots representative of an example methodology for generating pressure-compensated touch position data from touch position information using dual-complementary capacitance measurements $C_{SA}$ and $C_{SB}$. Touch position information is generated from position and pressure functions in which: (a) the position function generates position information as a function of $(C_{SA}/C_{SB})$; and (b) the pressure function generates pressure information as a function of $(C_{SA}*C_{SB})$.

Figure 5A:
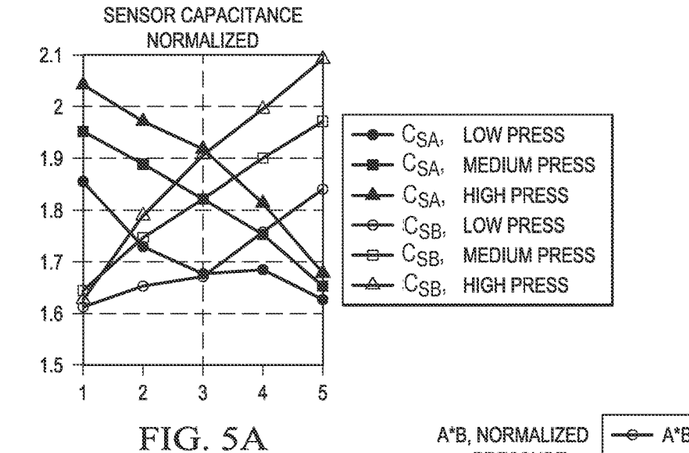
(FIG. 5A) is an example plot illustrating complementary sensor capacitances $C_{SA}$ and $C_{SB}$, at low, medium, high pressures.
Figure 5B:
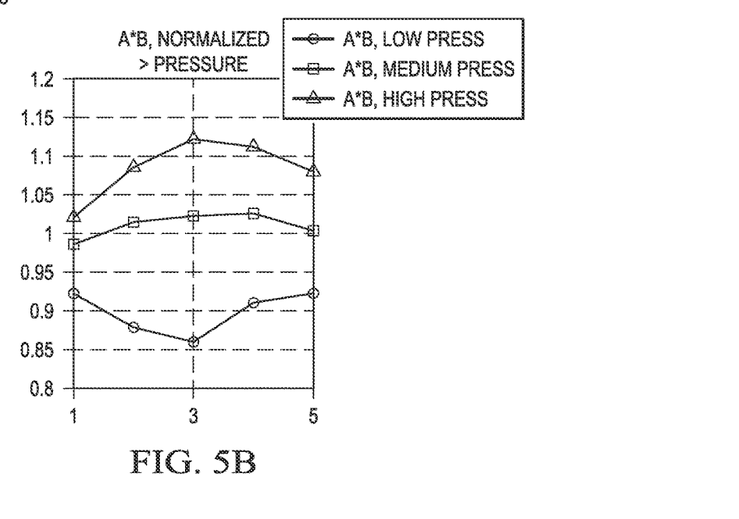
(FIG. 5B) is an example plot illustrating the pressure function ($C_{SA}*C_{SB}$). Note that the function ($C_{SA}*C_{SB}$) will be a monotonic function of pressure.

FIG. 5A is an example plot illustrating complementary sensor capacitances $C_{SA}$ and $C_{SB}$, at low, medium, high pressures. Note that pressure change can be greater than position change. FIG. 5B is an example plot illustrating the pressure function $(C_{SA}*C_{SB})$. Note that the function $(C_{SA}*C_{SB})$ will be a monotonic function of pressure.

As functions of both position and pressure. $C_{SA}$ and $C_{SB}$ are nonlinear, and therefore the position function $C_{SA}/C_{SB}$ and the pressure function $C_{SA}*C_{SB}$ are nonlinear. Touch position information derived from the position function $C_{SA}/C_{SB}$ can be corrected based on the pressure function $C_{SA}*C_{SB}$. For example, touch position information can be generated based on either: (a) correcting position information $(C_{SA}/C_{SB})$ based on a pressure-correction factor derived from a look-up-table accessed using the sensor capacitances $C_{SA}$ and $C_{SB}$; or (b) correcting the position information $(C_{SA}/C_{SB})$ based on an exponential function of $(C_{SA}*C_{SB})$.

Figure 6A:
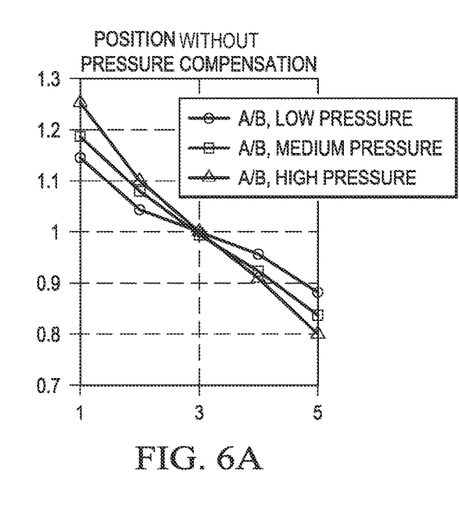
FIGS. 6A/6B/6C are example plots associated with generating pressure-compensated touch position data, in particular by generating touch pressure information used to correct touch position information based on an exponential function of ($C_{SA}*C_{SB}$), specifically: $(C_{SA}/C_{SB})^\wedge(C_{SA}*C_{SB})^{-P}$.
Figure 6B:
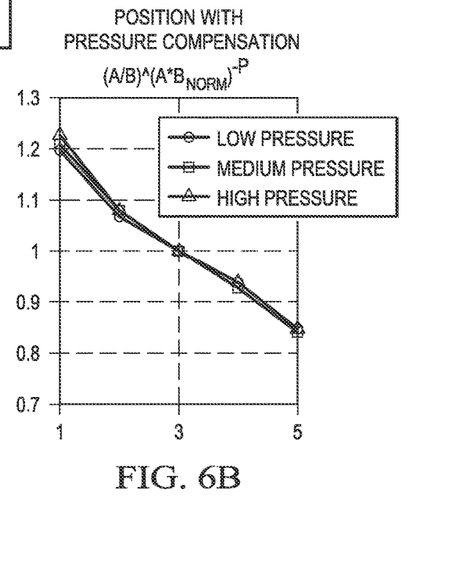
Figure 6C:
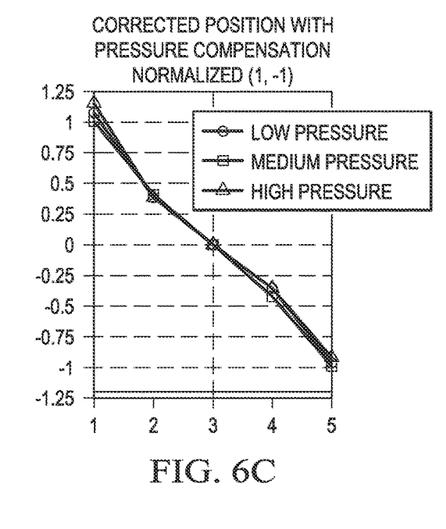

FIGS. 6A/6B/6C are example plots associated with generating pressure-compensated touch position data, in particular by generating touch pressure information used to correct touch position information based on an exponential function of $(C_{SA}*C_{SB})$, specifically: $(C_{SA}/C_{SB})^{\wedge}(C_{SA}*C_{SB})^{-P}$.

FIG. 6A is an example plot illustrating position information without pressure compensation. FIG. 6B is an example plot illustrating pressure-compensated position data generated from position information generated according to the exponential function $(C_{SA}*C_{SB})^{-P}$, so that the pressure-compensated touch position data corresponds to: $(C_{SA}/C_{SB})^{\wedge}(C_{SA}*C_{SB})^{-P}$. FIG. 6C is an example plot illustrating the pressure-compensated touch position data, normalized to (1,−1).

Figure 7A:
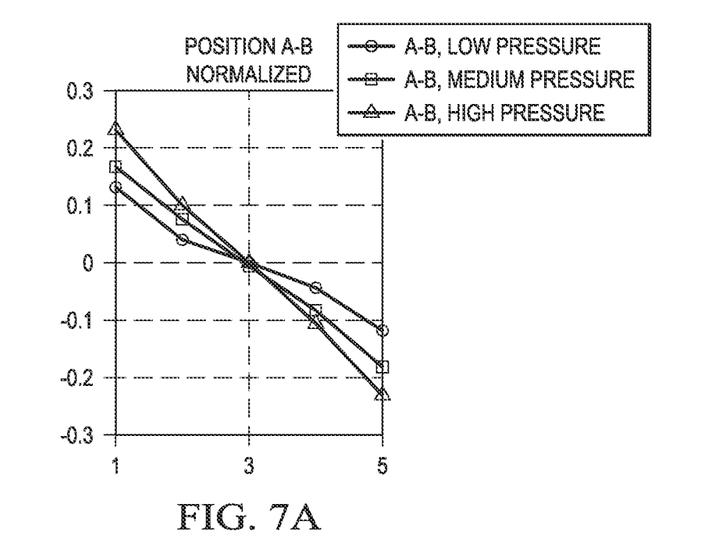
FIGS. 7A/7B are example plots representative of an example methodology for generating pressure-compensated touch position data from touch position information using dual-complementary capacitance measurements $C_{SA}$ and $C_{SB}$, where the touch position information is generated from position and pressure functions in which: (a) the position function generates position information as a function of ($C_{SA}-C_{SB}$); and (b) the pressure function generates pressure information as a function of ($C_{SA}+C_{SB}$).
Figure 7B:
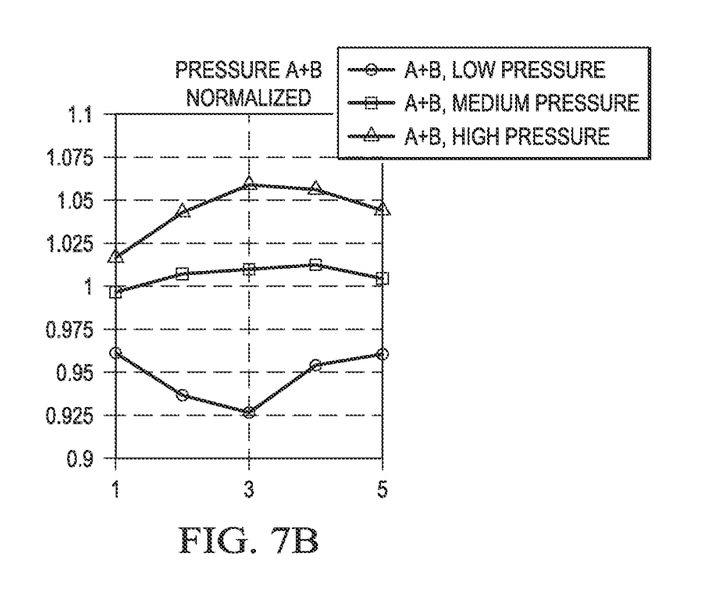

FIGS. 7A/7B are example plots representative of an example methodology for generating pressure-compensated touch position data from touch position information using dual-complementary capacitance measurements $C_{SA}$ and $C_{SB}$, where the touch position information is generated from position and pressure functions in which: (a) the position function generates position information as a function of $(C_{SA}-C_{SB})$; and (b) the pressure function generates pressure information as a function of $(C_{SA}+C_{SB})$.

FIG. 7A is an example plot in which the position function $(C_{SA}/C_{SB})$ is approximated by the position functions $(C_{SA}-C_{SB})$. FIG. 7B is an example plot in which the pressure function $(C_{SA}*C_{SB})$ is approximated by $(C_{SA}+C_{SB})$. These approximations can be used for applications where relative changes in sensor capacitance are small (small range of motion), or for applications requiring lower resolution. Advantages of this approach include a position processor without a multiplier can process the position information.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A capacitive sensing system suitable for sensing touch position along a sensor track based on touch capacitance, comprising: the sensor track defined by a capacitive sensor including first and second segmented capacitive electrodes with respective first and second electrode segments, interleaved along the sensor track, from a first end to a second end, and from the first end to the second end, each of the first electrode segments after an initial first electrode segment having a successively larger size than a previous first electrode segment, and each of the second electrode segments after an initial second electrode segment having a successively smaller size than a previous second electrode segment; the first and second electrode segments of the first and second segmented capacitive electrodes dimensioned such that:

a touch contact area at a touch position of the sensor track extends over at least one segment of both segmented capacitive electrodes; and as touch position moves from the first end to the second end along the sensor track, the touch position moves from segment-to-segment of the interleaved first and second electrode segments, and a first electrode capacitance CSA of the first segmented capacitive electrode monotonically decreases from segment-to-segment of the first electrode segments, and a second electrode capacitance CSB of the second segmented capacitive electrode monotonically increases from segment-to-segment of the second electrode segments; and a sensor unit coupled to the first and second segmented capacitive electrodes, to generate pressure-compensated touch position data corresponding to the touch position, the sensor unit including acquisition circuitry to acquire capacitance measurements CSA and CSB from respectively the first and second segmented capacitive electrodes; and conversion circuitry to generate touch position information based on position and pressure functions, where the position function generates position information based on CSA and CSB, the pressure function generates pressure information based on CSA and CSB; the sensor unit to generate the pressure-compensated touch position data based on the touch position information, including compensation for changes in touch capacitance due to touch pressure.

2. The system of claim 1, wherein
the position function generates position information as a function of $(C_{SA}/C_{SB})$; and
the pressure function generates pressure information as a function of $(C_{SA}*C_{SB})$.

3. The system of claim 2, wherein the touch position information is generated based on either:
correcting the position information based on a pressure-correction factor derived from a look-up-table accessed using the sensor capacitances $C_{SA}$ and $C_{SB}$; or
correcting the position information, which is a function of $(C_{SA}/C_{SB})$ based on an exponential function $(C_{SA}*C_{SB})^{-P}$, where P is a pre-defined pressure correction exponent.

4. The system of claim 1, wherein
the position function generates position information as a function of $(C_{SA}-C_{SB})$; and
the pressure function generates pressure information as a function of $(C_{SA}+C_{SB})$.

5. The system of claim 1, wherein the sensor unit comprises:
a capacitance-to-digital conversion (CDC) circuit to drive the first and second sensor electrodes, and to acquire the capacitance readings $C_{SA}$ and $C_{SB}$, and to convert them to corresponding touch position information; and
a position processing circuit to generate the pressure-compensated touch position data from the touch position information based on the position and pressure functions.

6. The circuit of claim 1, wherein
the position function generates position information as a function of $(C_{SA}-C_{SB})$; and
the pressure function generates pressure information as a function of $(C_{SA}+C_{SB})$.

7. A capacitive sensing circuit suitable for use in a capacitive sensing system for sensing touch position along a sensor track based on touch capacitance, the sensor track defined by a capacitive sensor including first and second capacitive electrodes with respective first and second electrode segments, interleaved along the sensor track, from a first end to a second end, and from the first end to the second end, each of the first electrode segments after an initial first electrode segment having a successively larger size than a previous first electrode segment, and each of the second electrode segments after an initial second electrode segment having a successively smaller size than a previous second electrode segment, the first and second electrode segments of the first and second segmented capacitive electrodes dimensioned such that a touch contact area at a touch position of the sensor track extends over at least one segment of both segmented capacitive electrodes, and such that, as touch position moves from the first end to the second end along the sensor track, the touch position moves from segment-to-segment of the interleaved first and second electrode segments, and a first electrode capacitance CSA of the first segmented capacitive electrode monotonically decreases from segment-to-segment of the first electrode segments, and a second electrode capacitance CSB of the second segmented capacitive electrode monotonically increases from segment-to-segment of the second electrode segments, the capacitive sensing circuit comprising:

acquisition circuitry coupled respectively to the first and second segmented capacitive electrodes, to acquire respective capacitance measurements CSA and CSB; and conversion circuitry to generate touch position information based on position and pressure functions, where the position function generates position information based on CSA and CSB; the pressure function generates pressure information based on CSA and CSB; and processor circuitry to generate pressure-compensated touch position data corresponding to the touch position based on the touch position information, including compensation for changes in touch capacitance due to touch pressure.

8. The circuit of claim 7, wherein
the position function generates position information as a function of $(C_{SA}/C_{SB})$; and
the pressure function generates pressure information as a function of $(C_{SA}*C_{SB})$.

9. The circuit of claim 8, wherein the touch position information is generated based on either:
correcting the position information based on a pressure-correction factor derived from a look-up-table accessed using the sensor capacitances $C_{SA}$ and $C_{SB}$; or
correcting the position information, which is a function of $(C_{SA}/C_{SB})$ based on an exponential function $(C_{SA}*C_{SB})^{-P}$, where P is a pre-defined pressure correction exponent.

10. The circuit of claim 7, wherein the sensor unit comprises:
a capacitance-to-digital conversion (CDC) circuit to drive the first and second sensor electrodes, and to acquire the capacitance readings $C_{SA}$ and $C_{SB}$, and to convert them to the touch position information; and a position processing circuit to generate the pressure-compensated touch position data from touch position information based on the position and pressure functions.

11. A method of capacitive sensing suitable for sensing touch position along a sensor track based on touch capacitance, the method operable with a sensor track defined by a capacitive sensor including first and second segmented capacitive electrodes with respective first and second electrode segments, interleaved along the sensor track, from a first end to a second end, and from the first end to the second end, each of the first electrode segments after an initial first electrode segment having a successively larger size than a previous first electrode segment, and each of the second electrode segments after an initial second electrode segment having a successively smaller size than a previous second electrode segment, the first and second electrode segments of the first and second segmented capacitive electrodes dimensioned such that a touch contact area at a touch position of the sensor track extends over at least one segment of both segmented capacitive electrodes, and such that, as touch position moves from the first end to the second end along the sensor track, the touch position moves from segment-to-segment of the interleaved first and second electrode segments, and a first electrode capacitance CSA of the first segmented capacitive electrode monotonically decreases from segment-to-segment of the first electrode segments, and a second electrode capacitance CSB of the second segmented capacitive electrode monotonically increases from segment-to-segment of the second electrode segments, the method comprising:

acquiring, from the first and second segmented capacitive electrodes, respective capacitance measurements CSA and CSB; and generating touch position information based on position and pressure functions, where the position function generates position information based on CSA and CSB;

the pressure function generates pressure information based on CSA and CSB; and generating pressure-compensated touch position data corresponding to the touch position based on the touch position information, including compensation for changes in touch capacitance due to touch pressure.

12. The method of claim 11, wherein
the position function generates position information as a function of $(C_{SA}/C_{SB})$; and
the pressure function generates pressure information as a function of $(C_{SA}*C_{SB})$.

13. The method of claim 11, wherein
the position function generates position information as a function of $(C_{SA}-C_{SB})$; and
the pressure function generates pressure information as a function of $(C_{SA}+C_{SB})$.

14. The method of claim 13, wherein the touch position information is generated based on either:

correcting the position information based on a pressure-correction factor derived from a look-up-table accessed using the sensor capacitances $C_{SA}$ and $C_{SB}$; or correcting the position information, which is a function of $(C_{SA}/C_{SB})$ based on an exponential function $(C_SA*C_{SB})^{-P}$, where P is a pre-defined pressure correction exponent.

* * * * *